United States Patent [19]
Schmidt

[11] Patent Number: 5,669,667
[45] Date of Patent: Sep. 23, 1997

[54] MOTOR-VEHICLE SEAT HEADREST

[75] Inventor: Reinhard Schmidt, Lennestadt, Germany

[73] Assignee: R. Schmidt GmbH, Lennestadt, Germany

[21] Appl. No.: 680,603

[22] Filed: Jul. 16, 1996

[30] Foreign Application Priority Data

Aug. 2, 1995 [DE] Germany .......... 195 28 274.4

[51] Int. Cl.⁶ .................................................. B60N 2/48
[52] U.S. Cl. ................................... 297/408; 297/403
[58] Field of Search ........................ 297/391, 408, 297/403, 409

[56] References Cited

U.S. PATENT DOCUMENTS

| | | | |
|---|---|---|---|
| 4,191,423 | 3/1980 | Goldner | 297/408 |
| 4,673,214 | 6/1987 | Meiller | 297/408 |
| 4,923,250 | 5/1990 | Hattori | 297/408 X |
| 5,222,784 | 6/1993 | Hamelin | 297/408 |
| 5,288,129 | 2/1994 | Nemoto | 297/408 X |
| 5,364,164 | 11/1994 | Kuranami | 297/408 |

FOREIGN PATENT DOCUMENTS

| | | | |
|---|---|---|---|
| 2927652 | 1/1981 | Germany | 297/408 |
| 2240920 | 8/1991 | United Kingdom | 297/408 |

*Primary Examiner*—Peter R. Brown
*Attorney, Agent, or Firm*—Herbert Dubno; Andrew Wilford

[57] ABSTRACT

A headrest assembly used in a motor-vehicle seat formed with an upwardly open recess has a pair of complementary housing shells having mating annular edges that meet and are joined together substantially on an upright plane to form a cavity. Each shell is formed with a pair of seat halves open at the plane and forming with the seat halves of the other shell a pair of seats aligned along a horizontal axis and lying on the plane. The joined shells are set and secured in the recess of the seat. Respective pivot bodies in the cavity engaged in the seats are pivotal therein about the axis between upright and horizontal positions. Respective support rods extend radially from the pivot bodies out of the cavity and a headrest is fixed on the support rods outside the cavity.

8 Claims, 1 Drawing Sheet

U.S. Patent     Sep. 23, 1997     5,669,667
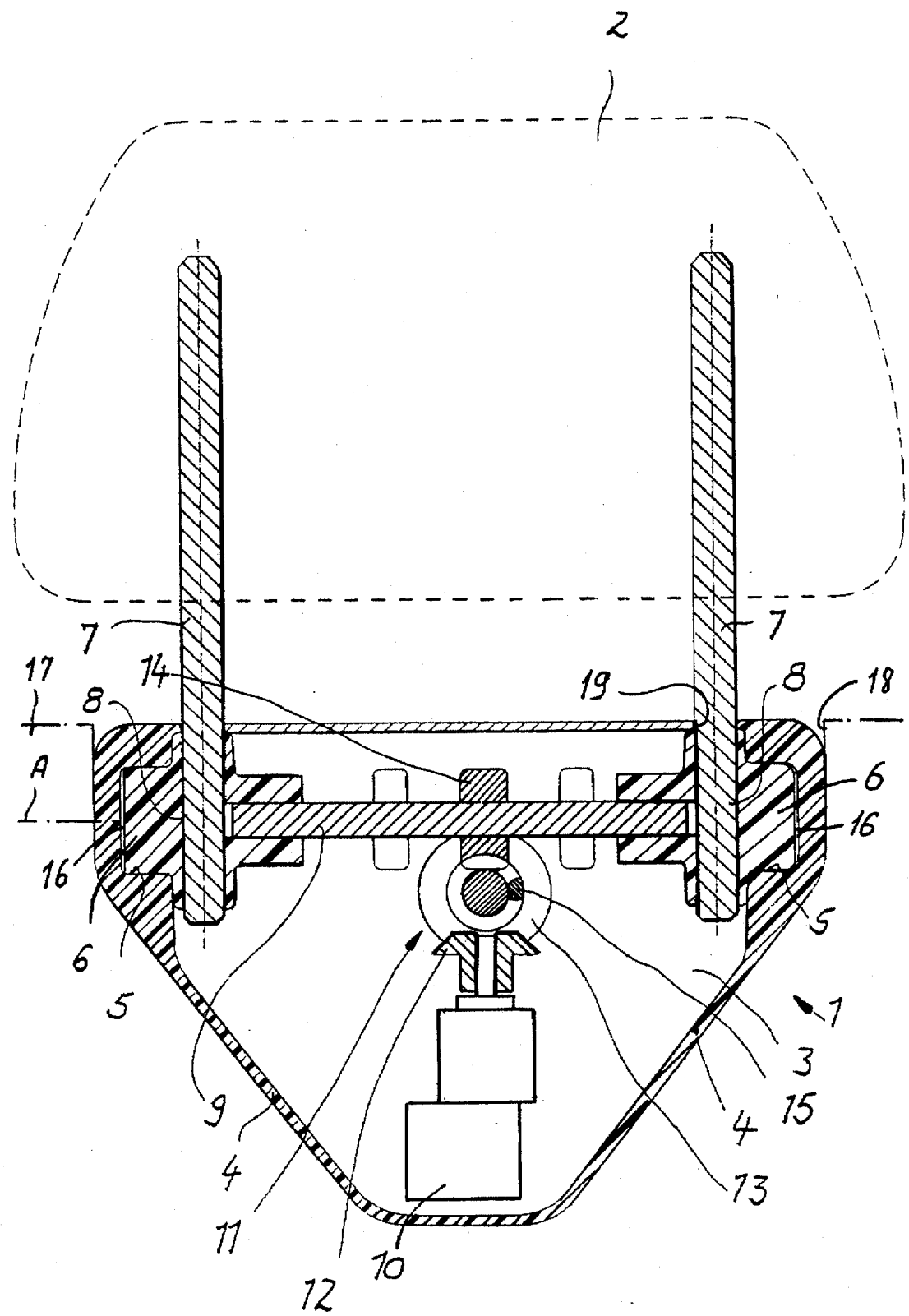

MOTOR-VEHICLE SEAT HEADREST

FIELD OF THE INVENTION

The present invention relates to a headrest for a motor-vehicle seat. More particularly this invention concerns such a headrest that is pivotal between an upright use position and a folded-back position.

BACKGROUND OF THE INVENTION

A standard motor-vehicle headrest assembly of the fold-back type is typically built into the back of a motor-vehicle seat or into the structure immediately behind it. The various pivot parts, drive, and so on must be mounted individually in the vehicle somewhere along the production line, a complicated and expensive task. When the headrest is of the automatically retracting type which folds back when the vehicle is stopped, the installation of its various drive parts and connection to the vehicle control system is fairly complex.

OBJECTS OF THE INVENTION

It is therefore an object of the present invention to provide an improved motor-vehicle headrest assembly.

Another object is the provision of such an improved motor-vehicle headrest which overcomes the above-given disadvantages, that is which is simple to install.

SUMMARY OF THE INVENTION

A headrest assembly used in a motor-vehicle seat formed with an upwardly open recess has according to the invention a pair of complementary housing shells having mating annular edges that meet and are joined together substantially on an upright plane to form a cavity. Each shell is formed with a pair of seat halves open at the plane and forming with the seat halves of the other shell a pair of seats aligned along a horizontal axis and lying on the plane. The joined shells are set and secured in the recess of the seat. Respective pivot bodies in the cavity engaged in the seats are pivotal therein about the axis between upright and horizontal positions. Respective support rods extend radially from the pivot bodies out of the cavity and a headrest is fixed on the support rods outside the cavity.

Thus the arrangement according to the invention can be installed as a simple one-piece unit. The seats for the entire model line can be constructed at no extra cost with the recess either in the seat back or in the shelf behind it which is simply blocked for the low-end models not getting the headrest according to the invention. There is therefore a substantial saving in manufacturing costs.

According to the invention the rods are releasably set in the respective pivot bodies. This makes it possible to remove the headrest cushion, for instance to fit upholstery over the seat. In addition the pivot bodies are provided with friction elements engaging the respective seats.

The headrest assembly according to the invention also has a shaft extending along the axis between the bodies and having ends seated in the respective bodies as well as means for locking the bodies in their positions including a standard ratchet type stop or a drive motor in the cavity connected to the bodies via a self-locking worm-gear transmission between the motor and the bodies. Such a construction is extremely strong and the headrest assembly itself is very easy to manufacture and, once the edges of the two housing shells are welded together, makes a strong and easy to handle unit.

A torsion spring mounted on the shaft and a latch device for the pivot bodies can together allow remote actuation of the headrests. Thus a bowden cable, pneumatic, or electric connection to the latch assembly will release the headrest and the spring will flop it back into the storage position.

BRIEF DESCRIPTION OF THE DRAWING

The above and other objects, features, and advantages will become more readily apparent from the following description, reference being made to the accompanying drawing whose sole FIGURE is a largely diagrammatic view of the headrest according to the invention.

SPECIFIC DESCRIPTION

As seen in the drawing a motor-vehicle seat 17 according to the invention is formed with an upwardly open recess 18 in which is engaged a housing 1 formed by a pair of substantially identical shells 3 (only one shown) whose edges 4 are welded together. Each shell 3 forms two halves of two identical cylindrical seats 5 centered on a common horizontal axis A. Each such seat 4 in turn receives a respective cylindrical pivot body 6 having at its end a friction layer 16 that frictionally resists pivoting of the body 6 in the seat 5.

Respective rods 7 project diametrally through each of the bodies and extend parallel to each other out of the housing 1 through 90° slots 19 therein. Outer ends of the rods 7 are seated in a head cushion 2 shown in dashed lines. Thus the cushion 2 can pivot between the illustrated upright position with the rods 7 substantially vertical and an unillustrated storage position with the rods 7 generally horizontal.

An electric drive motor 10 in the cavity formed between the pair of shells 3 is connected via a worm-gear transmission 11 to the bodies 6. To this end the bodies 6 are connected together by a shaft 9 extending along the axis A and having ends seated in these bodies 6 and a center carrying an output gear 14. An input bevel gear 12 carried by the motor meshes with another bevel gear 13 coupled to a worm 15 meshing with the worm gear 14 to rotate the shaft 9 and the entire pivotal assembly formed by this shaft 9, the bodies 6, the rods 7, and the cushion 2 about the axis A. The transmission 11 is of the high step-down locking type, that is it can rotate the shaft 9 but no normal angular force applied to this shaft 9 can reverse drive the motor 10.

I claim:

1. In combination with a motor-vehicle seat formed with an upwardly open recess, a headrest assembly comprising:

a pair of complementary housing shells having mating annular edges that meet and are joined together substantially on an upright plane to form a cavity, each shell being formed inside the cavity with a pair of seat halves open at the plane and forming inside the cavity with the seat halves of the other shell a pair of seats aligned along a horizontal axis and lying on the plane, the joined shells being set and secured in the recess of the seat;

respective pivot bodies inside the cavity engaged in the seats and pivotal therein about the axis between upright and horizontal positions;

respective support rods extending radially from the pivot bodies out of the cavity; and a headrest fixed on the support rods outside the cavity.

2. The motor-vehicle headrest assembly defined in claim 1 wherein the rods are releasably set in the respective pivot bodies.

3. The motor-vehicle headrest assembly defined in claim 1 wherein the pivot bodies are provided with friction elements engaging the respective seats.

4. The motor-vehicle headrest assembly defined in claim 1, further comprising a shaft extending along the axis between the bodies and having ends seated in the respective bodies.

5. The motor-vehicle headrest assembly defined in claim 1, further comprising means for locking the bodies in their positions.

6. The motor-vehicle headrest assembly defined in claim 5 wherein the means for locking includes a drive motor in the cavity connected to the bodies.

7. The motor-vehicle headrest assembly defined in claim 6 wherein the means for locking further includes a self-locking worm-gear transmission between the motor and the bodies.

8. In combination with a motor-vehicle seat formed with an upwardly open recess, a headrest assembly comprising:

a pair of complementary housing shells having mating annular edges that meet and are joined together substantially on an upright plane to form a cavity, each shell being formed inside the cavity with a pair of semicylindrical seat halves open at the plane and forming inside the cavity with the seat halves of the other shell a pair of cylindrical seats aligned along a horizontal axis, open toward each other, and lying on the plane, the joined shells being set and secured in the recess of the seat;

respective cylindrical pivot bodies inside the cavity engaged in the seats and pivotal therein about the axis between upright and horizontal positions;

a shaft lying on the axis and having ends fixed in the pivot bodies;

respective support rods extending radially from the pivot bodies out of the cavity;

a headrest fixed on the support rods outside the cavity;

a drive motor in the cavity; and a self-locking worm-gear transmission between the motor and the shaft for pivoting the bodies between their positions.

* * * * *